United States Patent
Naito et al.

(10) Patent No.: US 7,173,357 B2
(45) Date of Patent: Feb. 6, 2007

(54) AXIAL GAP TYPE DYNAMO-ELECTRIC MACHINE

(75) Inventors: Shinya Naito, Shizuoka (JP); Haruyoshi Hino, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 10/496,918

(22) PCT Filed: Nov. 29, 2002

(86) PCT No.: PCT/JP02/12500

§ 371 (c)(1),
(2), (4) Date: May 27, 2004

(87) PCT Pub. No.: WO03/047070

PCT Pub. Date: Jun. 5, 2003

(65) Prior Publication Data

US 2005/0073213 A1    Apr. 7, 2005

(30) Foreign Application Priority Data

Nov. 29, 2001    (JP) ............................... 2001-363613

(51) Int. Cl.
  *H02K 21/24*  (2006.01)
  *H02K 1/22*  (2006.01)
  *H02K 1/27*  (2006.01)
(52) U.S. Cl. .......................... 310/154.05; 310/156.33; 310/217; 310/218; 310/254; 310/268
(58) Field of Classification Search ................. 310/156.32–156.37, 154.05, 154.06, 216, 310/217, 218, 254, 261, 268
See application file for complete search history.

(56) References Cited

U.S. PATENT DOCUMENTS

| | | | | |
|---|---|---|---|---|
| 1,566,693 A | * | 12/1925 | Pletscher | 310/152 |
| 2,512,351 A | * | 6/1950 | Lynn | 310/247 |
| 5,218,251 A | * | 6/1993 | Allwine, Jr. | 310/49 R |
| 5,801,473 A | * | 9/1998 | Helwig | 310/254 |
| 5,814,914 A | * | 9/1998 | Caamano | 310/216 |
| 6,177,751 B1 | * | 1/2001 | Suzuki et al. | 310/269 |
| 2004/0135453 A1 | * | 7/2004 | Naito et al. | 310/156.32 |

FOREIGN PATENT DOCUMENTS

| | | |
|---|---|---|
| JP | 48-95107 | 11/1973 |
| JP | 48-97002 | 12/1973 |
| JP | 56-86843 | 7/1981 |
| JP | 3-86051 | 4/1991 |
| JP | 2001-54270 | 2/2001 |
| WO | WO0106623 A1 * | 1/2001 |

* cited by examiner

*Primary Examiner*—Darren Schuberg
*Assistant Examiner*—David W. Scheuermann
(74) *Attorney, Agent, or Firm*—Hogan & Hartson LLP

(57) ABSTRACT

There is provided an axial gap type rotating electric machine which is small-sized and achieves a high motor efficiency as a drive source having a high torque using, for example, a strong magnet by reducing an energy loss by an induced current.

An axial gap type rotating electric machine having a yoke on a side of a rotor in a circular plate shape fixed to a rotating shaft, a yoke 23 on a side of a stator in a circular plate shape opposed to the yoke on the side of the rotor, a magnet fixed to a side of an opposed face of either one of the yokes on the side of the rotor or the side of the stator, a plurality of teeth 24 arranged on a side of an opposed face of other yoke on the side of the rotor or the side of the stator radially and opposedly to the magnet and fixed to the yoke 23, and a coil wound around each of the plurality of teeth, in which the teeth 24 has a laminated member of plate members 124 for the teeth and faces 124a to be superposed of the plate members 124 for the teeth are arranged in a circumferential direction.

2 Claims, 16 Drawing Sheets

37: TEETH PRESS FIT HOLE

AXIAL GAP TYPE DYNAMO-ELECTRIC MACHINE

TECHNICAL FIELD

The present invention relates to a rotating electric machine having a rotor and a stator constituting an electric motor, a generator or the like and utilizing both operation of a motor and a generator as a regenerative brake when the rotating electric machine is used as a drive source of a vehicle.

BACKGROUND ART

A radial gap type electric motor is used as a general electric motor of a drive source or the like of an electric two-wheeled vehicle or the like. The radial gap type electric motor is provided with a magnet around an axis in a cylindrical shape on a side of, for example, a rotor, and provided with a plurality of teeth opposed to a cylindrical face of the magnet on a side of a stator and wound with coils around the teeth. Therefore, a gap between opposed faces of the magnet and the respective teeth is formed in a cylindrical shape along the axis.

Meanwhile, an axial gap type electric motor is used as a rotation drive source of an audio apparatus or the like having a comparatively small output. The axial gap type electric motor is constituted by a yoke on a side of a rotor in a circular plate shape fixed to a rotating shaft, a yoke on a side of a stator in a circular plate shape opposed to the yoke on the side of the rotor, a magnet fixed to a side of an opposed face of the yoke of either one yoke on the side of the rotor or the side of the stator, a plurality of teeth arranged on the side of an opposed face of other yoke on the side of the rotor or the side of the stator radially and opposedly to the magnet and coils wound around respective teeth. Therefore, a gap between the opposed faces of the magnet and the teeth is formed in a planar shape orthogonal to an axis.

FIG. 22 is an explanatory view of a magnetic flux of an axial gap type electric motor of a background art. The drawing shows a magnetic flux only with respect to one tooth 3 and illustration thereof is omitted with respect to left and right contiguous teeth 3.

The stator 1 is provided with a stator yoke 2 in a circular plate shape having a laminated member of steel plates and a plurality of teeth 3 each similarly having a laminated member of steel plates which are arranged radially above the stator yoke 2. Each tooth 3 is wound with a coil (not illustrated). A rotor (not illustrated) in a circular plate shape is arranged opposedly to the teeth 3 of the stator. A magnet is fixed to the rotor at a predetermined gap from upper faces of the teeth 3. Incidentally, the circular plate shape includes a circular shape and a planar ring shape (doughnut shape).

A magnetic circuit is formed between the rotor, not illustrated, and the stator, and a magnetic flux coming out from an N pole of the magnet is made to flow to the tooth 3 and to the stator yoke 2 (arrow A) and flow to an S pole (not illustrated) of the magnet by passing other teeth 3. By energizing the coil, the tooth of that coil is excited to attract and repulse the magnet of the rotor opposed to an upper face of the tooth. By successively switching energization of the coil, the excited teeth are successively moved and the rotor is rotated along with the magnet.

According to such an axial gap type motor, opposed faces of the magnet and the teeth are orthogonal to an axial direction and therefore, a length in the axial direction becomes shorter than that of the radial gap type. Also in the case of increasing an output, the opposed faces opposed to each other via the gap can be increased without prolonging the length in the axial direction and therefore, the constitution can contribute to thin formation of the motor.

However, according to the above-described axial gap type electric motor, by energizing the coil, the magnetic flux flowing from the tooth 3 to the stator yoke 2 is changed in a direction and a magnitude thereof since the magnet on the side of the rotor is rotated and by electromagnetic induction in accordance with an amount of the change, an induced current B in an eddy shape is made to flow at inside of the stator yoke 2 centering on the tooth 3 at a surrounding thereof (FIG. 22). The induced current B becomes Joule's heat to constitute loss of energy and the motor efficiency is reduced.

Although the loss of energy by the heat does not cause a serious problem in the case of a low output, when a strong magnet is used for achieving a large torque as in, for example, an electric two-wheeled vehicle, the loss is significantly increased and also a temperature rise rate is increased to bring about high temperatures.

Therefore, although such an axial gap type electric motor is of a thin type and regarded to be preferable to mount to an axle or the like of an electric two-wheeled vehicle, the motor efficiency is significantly reduced in the case of the electric two-wheeled vehicle having a high torque and using a strong magnet and therefore, the axial gap type electric motor is not applied as the drive source.

The invention takes a consideration of the above-described background art and it is an object thereof to provide an axial gap type rotating electric machine which is small-sized and achieves a high motor efficiency as, for example, a drive source having a high torque using a strong magnet by reducing energy loss by an induced current.

DISCLOSURE OF THE INVENTION

In order to achieve the above-described object, the invention provides an axial gap type rotating electric machine, including: a yoke on a side of a rotor in a circular plate shape fixed to a rotating shaft; a yoke on a side of a stator in a circular plate shape opposed to the yoke on the side of the rotor; a magnet fixed to a side of an opposed face of either one of the yokes on the side of the rotor or the side of the stator; a plurality of teeth arranged on a side of an opposed face of other yoke on the side of the rotor or the side of the stator radially and oppposedly to the magnet and fixed to the yoke; and a coil wound around each of the plurality of teeth; wherein the teeth comprises a laminated member of plate members for the teeth and faces to be superposed of the plate members for the teeth are arranged in a circumferential direction.

According to the constitution, an induced current by a magnetic flux flowing from the magnet to the teeth can effectively be reduced. This is based on the following reasons.

The magnet is constituted by a circular plate (doughnut shape) and therefore, in a circumferential direction of the teeth, the magnet is present also at a portion which is not opposed to the teeth. The magnetic flux coming out from that magnet is brought not in an opposed face (upper face) of the tooth but a side face (lateral face) on a side in a radial direction (C of FIGS. 17, 18). When the side face is disposed on a side of faces to be superposed of plate members of the teeth, an eddy current is formed at in-face and therefore, a large induced current is made to flow.

Meanwhile, even when the magnet is extruded in a radial direction from a face thereof opposed to the teeth, an amount thereof is small and therefore, also an amount of the magnetic flux coming out from the magnet (D of FIGS. 17, 18) is small. Therefore, even when the face is the face to be superposed of the plate members for the teeth, the loss is small. That is, the magnet opposed to the teeth is provided with an actual rectangular face opposed to the teeth and extruded portions of outer peripheral edges of four sides. The extruded portions of four sides are four sides of two inner and outer sides in the radial direction and two left and right sides in the circumferential direction. Among them, the extruded portions in the circumferential direction are larger than the extruded portions in the radial direction and therefore, by arranging a side face (face showing a plate thickness) of each plate member for the teeth opposedly to the magnetic flux from the circumferential direction, the eddy current is difficult to be formed and the induced current can be reduced.

In other words, since the extruded portions in the radial direction are smaller than the extruded portions in the circumferential direction, the induced current can be reduced by providing the magnetic flux of the portions to the side of the faces to be superposed of the plate members for the teeth.

Incidentally, almost all of the magnetic flux coming out from the magnet is brought into the teeth by passing the upper faces of the teeth, and the magnetic flux from the extruded portion is small.

A preferable constitution example is characterized in that a fixing hole for fixing the teeth provided at the yoke is formed into a shape having a longitudinal direction and the longitudinal direction is directed in the radial direction.

According to the constitution, a face of each plate member for the teeth from which a side face thereof is seen (a face in which an eddy current is difficult to flow) is arranged in the longitudinal direction, the face is arranged on a side having the large magnetic flux and therefore, the induced current can efficiently be reduced.

A preferable constitution example is characterized in that the fixing hole is a rectangular shape.

According to the constitution, the teeth can be formed by laminating the plate members for the teeth having a constant shape.

A preferable constitution example is characterized in that a magnetic resistance portion is provided between a side of the face to be superposed of the tooth and the fixing hole of the stator yoke According to the constitution, by increasing magnetic resistance by forming, for example, a space between the side of the faces to be superposed of the plate members for the teeth at which the eddy current is liable to be formed and the fixing hole, the magnetic flux passing the faces is reduced and the induced current is reduced.

A preferable constitution example is characterized in that a resistance portion against the induced current is provided between the side face showing a plate thickness of each plate member for the teeth and the fixing hole of the stator yoke.

According to the constitution, the induced current can effectively be reduced. That is, normally, a press fit face of the laminated teeth which is press-fit to the fixing hole is brought into close contact and the current is liable to flow and therefore, the eddy current is made to flow between the laminated plate members for the teeth. According to the invention, an electric resistance is increased and the induced current is reduced by providing a space or an insulating member or the like at the press fit close contact face.

BEST MODE FOR CARRYING OUT THE INVENTION

A description will be given of embodiments of the invention with reference to the drawings as follows.

Figure 1:
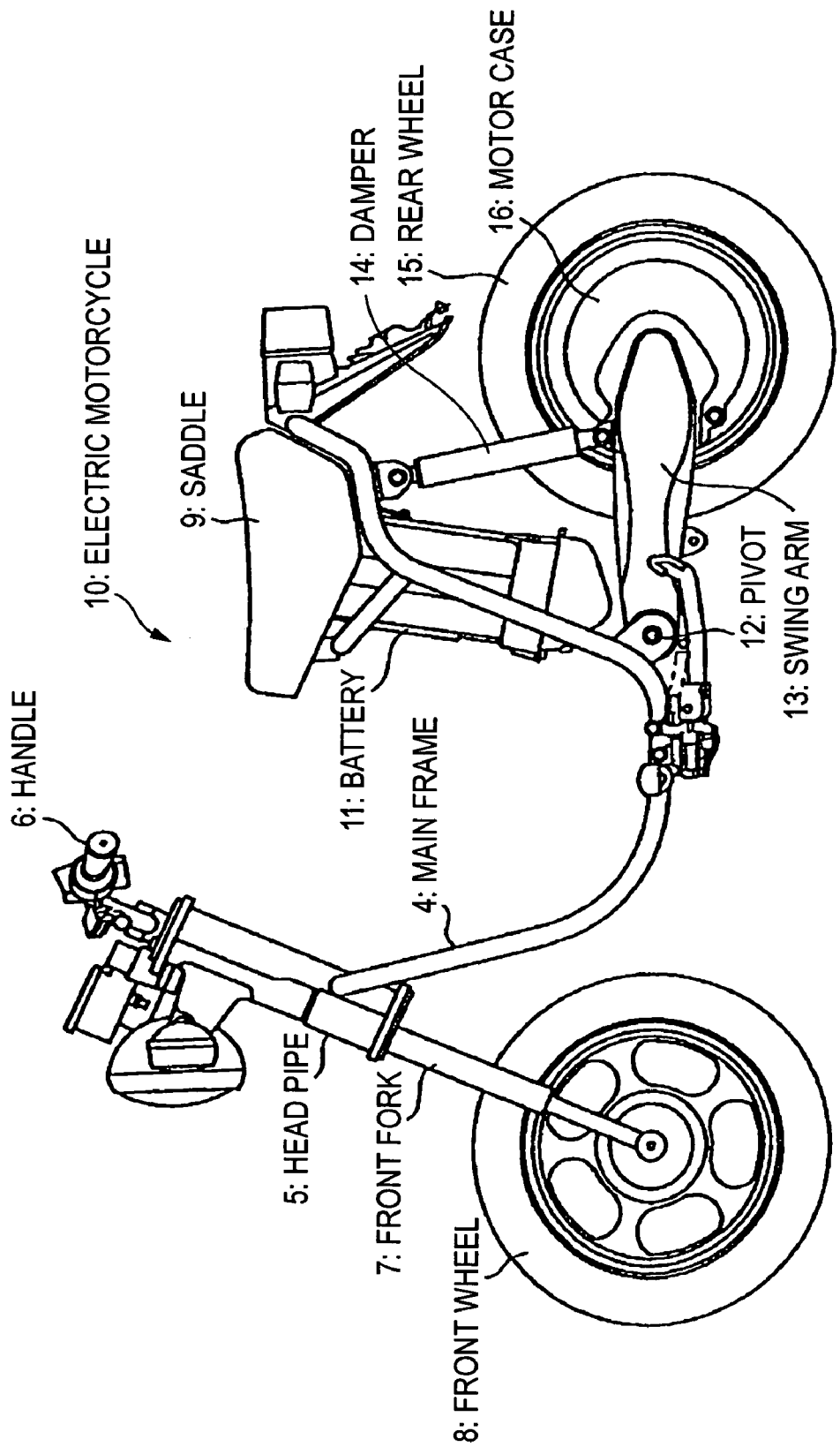
FIG. 1 is a side view of an electric two-wheeled vehicle to which the invention is applied.

FIG. 1 is a side view of an electric two-wheeled vehicle to which an axial gap type electric motor of the invention is applied.

The electric two-wheeled vehicle 10 is mounted with a steering shaft (not illustrated) of a handle 6 which is inserted to a head pipe 5 fixedly attached to a front end of a main frame 4 and supports a front wheel 8 via a front fork 7 connected thereto. A saddle 9 is provided at a central portion of a vehicle body and a battery 11 is fixed to the main frame 4 on a lower side of the saddle. A swing arm 13 is pivotably supported by way of a pivot 12 via a damper 14 from a central portion to a rear side of the main frame 4. A motor case 16 is integrally formed at a rear end portion on the swing arm 13. An axial gap type electric motor according to the invention, mentioned later, is mounted to inside of the motor case 16 along with an axle (not illustrated) of a rear wheel 15 and coaxially with the axle.

Figure 2:
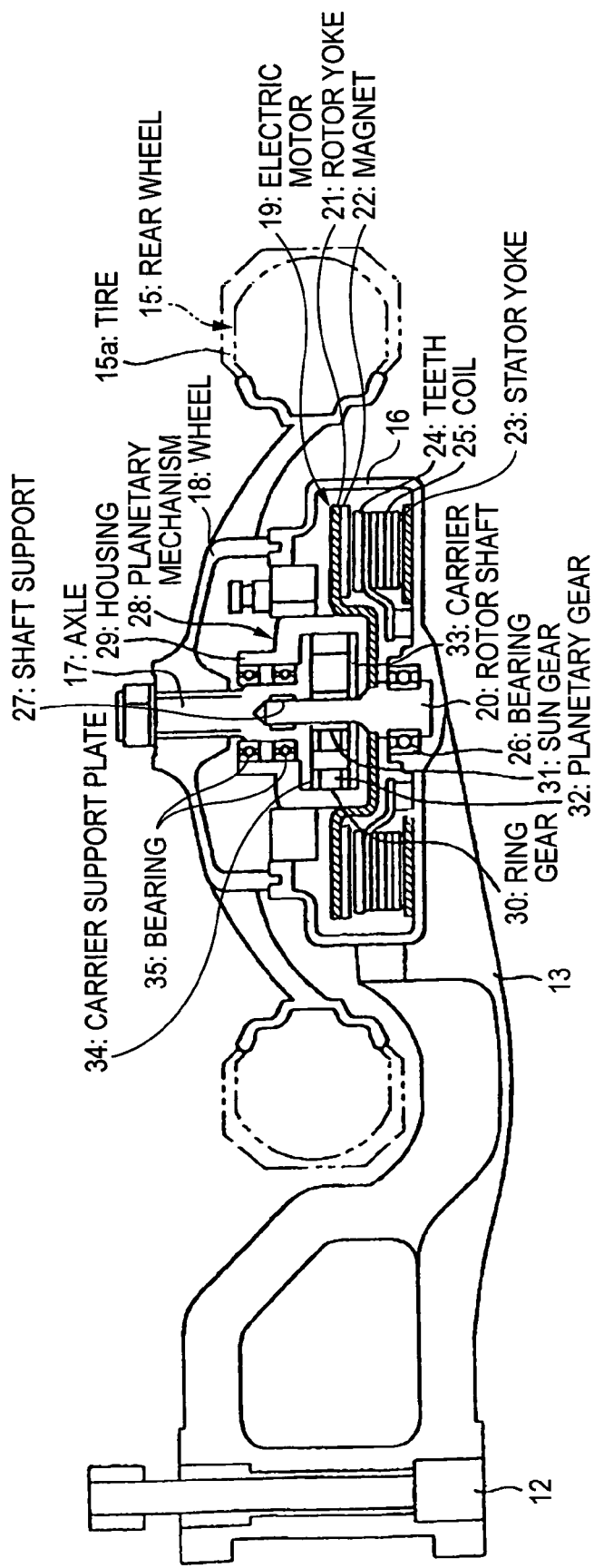
FIG. 2 is a diagram of a rear wheel portion of the electric two-wheeled vehicle of FIG. 1.

FIG. 2 is a diagram of an essential portion of a rear wheel portion of the electric two-wheeled vehicle.

A tire 15a of the rear wheel 15 is mounted with a wheel 18 fixed to an axle 17. An electric motor 19 of an axial gap type is mounted to inside of the motor case 16 integral with the swing arm 13. The electric motor 19 is constituted by a rotor shaft 20, a rotor yoke 21 fixed to the rotor shaft 20, a magnet 22 fixed to the rotor yoke 21, a stator yoke 23 fixed to the motor case 16, a plurality of teeth 24 fixed to the stator yoke 23 by being aligned radially and opposedly to the magnet 22, and a coil 25 wound around each of the teeth 24.

One end portion of the rotor 20 is rotatably supported by the motor case 16 via a bearing 26 and other end thereof is rotatably supported by the axle 17 via a shaft support 27. The rotor shaft 20 is connected to the axle 17 via a planetary mechanism 28. The planetary mechanism 28 per se is publicly known and constituted by a cylindrical housing 29, a ring gear 30 provided at an inner face of the housing 29, a sun gear 31 provided at the rotor shaft 20, a planetary gear 32 rotated and revolved by being brought in mesh with the sun gear 31 and the ring gear 30, a carrier 33 supporting the planetary gear 32 and a carrier support plate 34 supporting the carrier 33 and integral with the axle 17. The axle 17 is rotatably attached to the housing 29 via a bearing 35.

Figure 3:
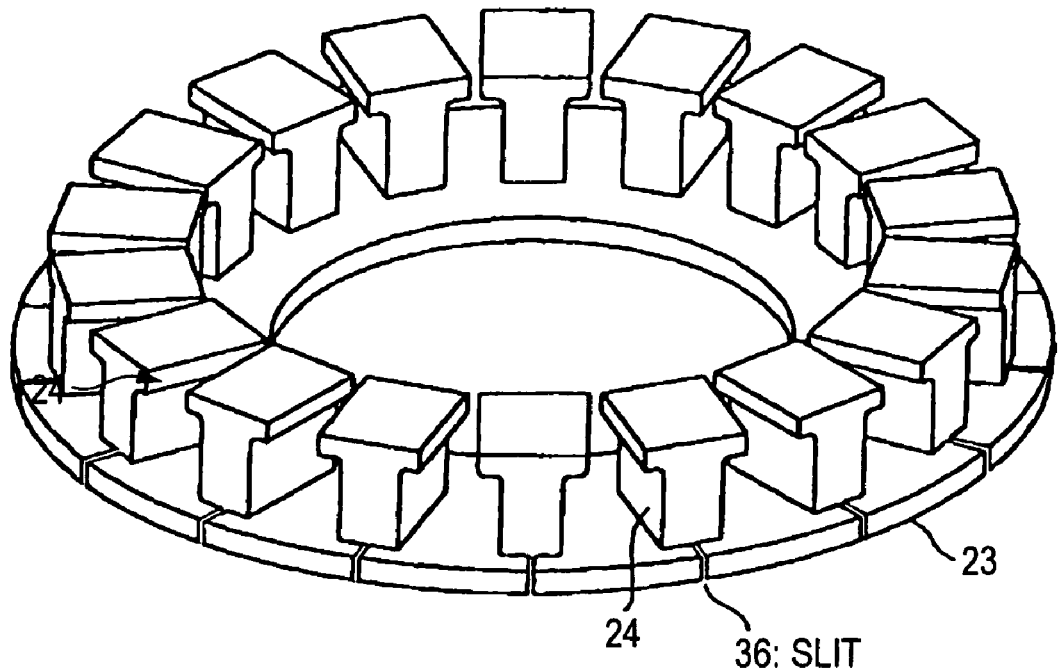
FIG. 3 is a perspective view of a constitution of an essential portion of a stator according to an embodiment of the invention.

FIG. 3 is a diagram of an essential portion of a stator portion of an axial gap type electric motor according to the invention.

Figure 11:
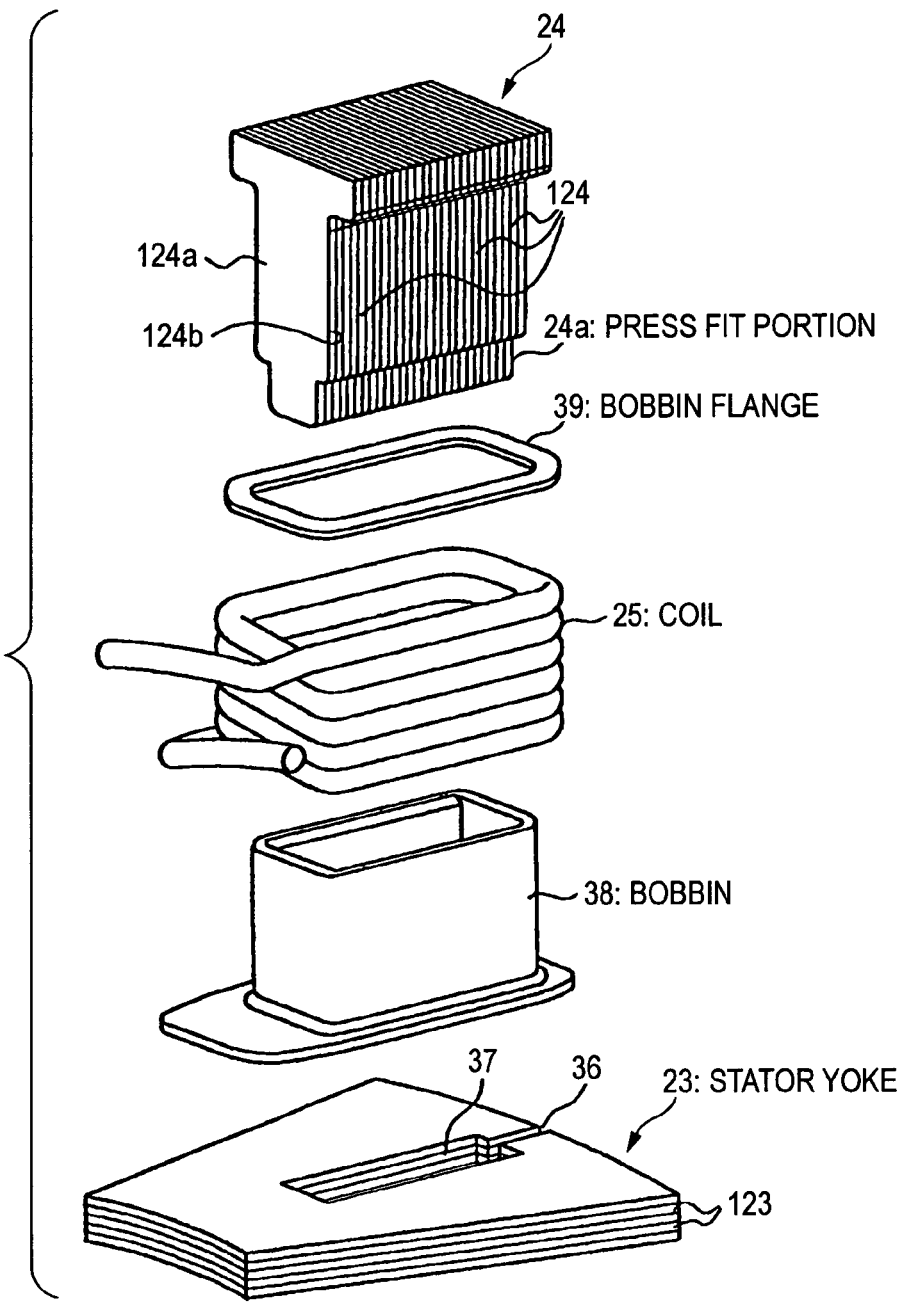
FIG. 11 is an exploded view of a stator according to an embodiment of the invention.

A plurality of the teeth 24 each having a laminated member of steel plates are radially arranged above the stator yoke 23 in a circular plate shape (doughnut shape) having a laminated member of steel plates and is, for example, fixedly press-fit thereto. As shown in FIG. 11, mentioned later, the stator yoke 23 is formed by laminating plate members 123 for the yoke constituted by punching steel plates (in a doughnut shape as shown in FIG. 3 in this example). Further, as shown in FIG. 11, the teeth 24 are formed by laminating plate members 124 for the teeth constituted by punching steel plates.

The plate members 124 for the teeth are laminated by superposing front and rear plate faces 124a. A side face 124b in correspondence with a plate thickness of a steel plate is exposed to a side face of the tooth 24 which is the laminated member. According to the example, a laminating direction is a radius direction (radial direction) and the tooth 24 is fixedly press-fit to the yoke 23 such that a direction of the plate face 124a constituting the face to be superposed becomes a circumferential direction.

The coil 25 (FIG. 2) is wound around each tooth 24. As shown in FIG. 2, mentioned above, the magnet 22 fixed to the rotor yoke 21 in the circular plate shape is arranged opposedly to the teeth 24 with a predetermined gap therebetween. According to the embodiment, a slit 36 is formed by cutting the stator yoke 23 on an outer peripheral side of each tooth 24.

Figure 4:
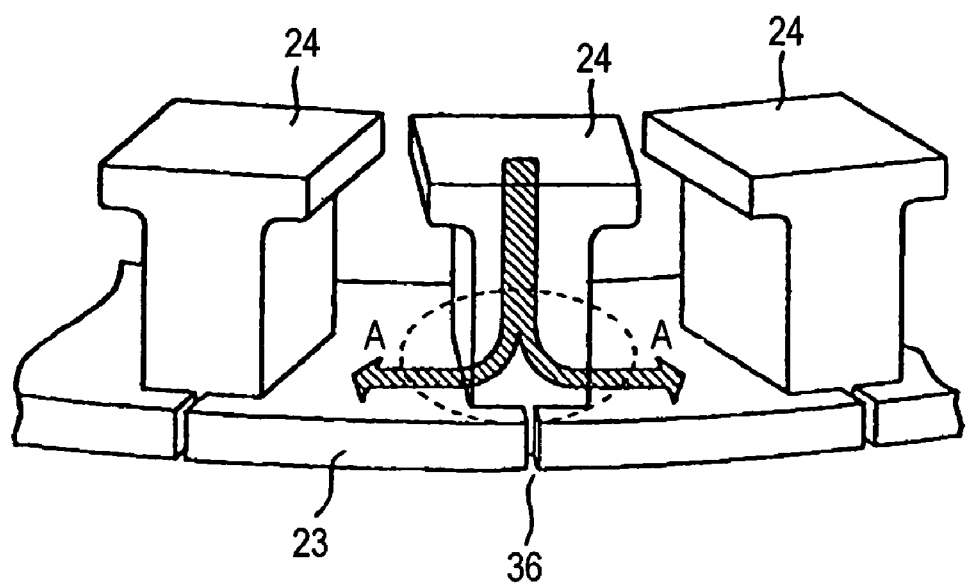
FIG. 4 is an explanatory view of operation of the embodiment of the invention.

FIG. 4 is an explanatory view of operation of the slit provided at the stator yoke.

By energizing the coil (not illustrated) wound around each tooth 24, the tooth 24 of the coil is excited to attract and repulse the magnet of the rotor (not illustrated) opposed to an upper face of the tooth. By successively switching the excited coil, the rotor is made to rotate by successively attracting and repulsing the magnet. At this occasion, a magnetic flux is made to flow from a side of the magnet to the teeth 24 and a magnetic path is formed by passing the magnet, the predetermined tooth 24 and the stator yoke 23.

The magnetic flux forming the magnetic path is made to flow from the predetermined tooth 24 by passing the stator yoke 23 as shown by an arrow A. As explained with reference to FIG. 17, an induced current is generated at inside of the stator yoke 23 at a surrounding of the tooth 24 (at a position of a dotted line in the drawing). However, according to the embodiment, the slit 36 for constituting an insulating layer is formed at the stator yoke 23 on an outer peripheral side of a press fit portion of a root portion of each tooth 24 and therefore, an induced current is blocked and substantially, the induced current does not flow.

That is, the slit 36 constitutes a resistance portion against the induced current and the induced current is blocked or reduced. The resistance portion is not limited to a slit having a slender interval but may be formed by a space portion of a cut having almost no interval or a hole having other shape or the like. Further, an insulating film may be interposed or an insulating agent of a resin or the like may be filled therein. Or, the induced current may be reduced by providing an insulating property by denaturing a portion at which the induced current flows by a treatment of a chemical treatment, a laser treatment or the like.

Figure 5:
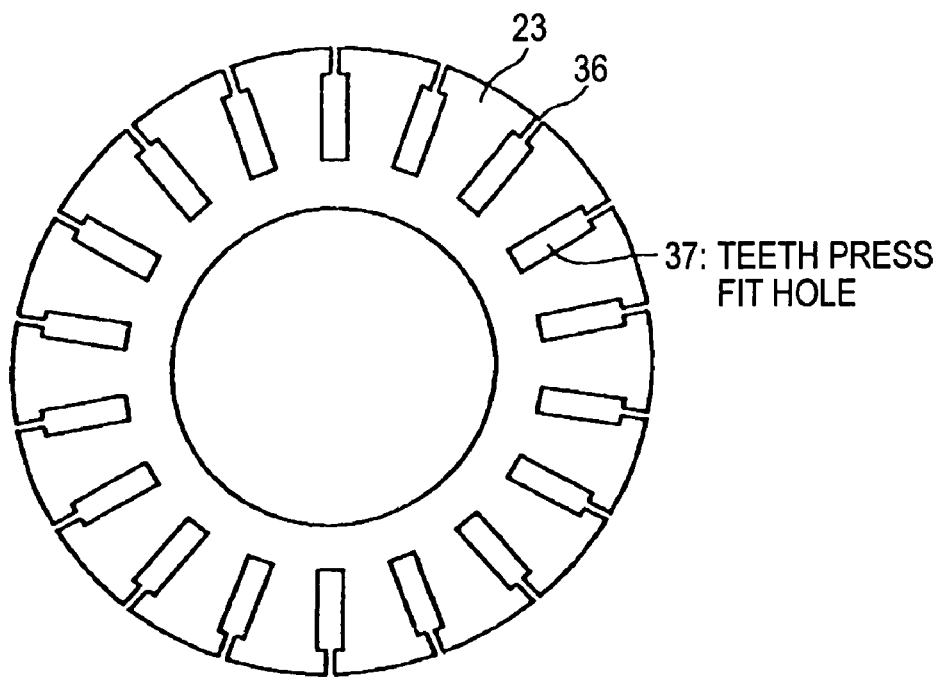
FIG. 5 is a plane view of a stator yoke of the embodiment of the invention.

FIG. 5 is a plane view of the stator yoke according to the embodiment of the invention.

The stator yoke 23 in the ring-like shape is formed to be penetrated by a plurality of teeth press fit holes 37. The slit 36 opened to an outer peripheral side of each press fit hole 37 is formed by cutting the stator yoke 23.

The press fit hole 37 is a fixing portion for inserting a portion of the tooth (press fit portion 24a in FIG. 11) to fix to the yoke. The fixing portion may be a hole penetrating the yoke 23 in a plate thickness direction as shown in FIG. 9(A), mentioned later, or maybe recess which does not penetrate therethrough but formed with a hole to a middle thereof as shown in FIG. 9(C).

Figure 6:
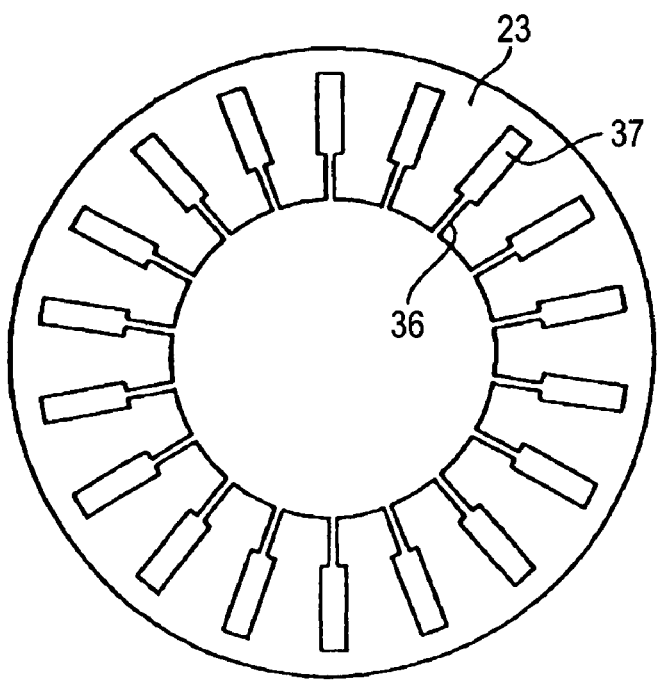
FIG. 6 is a plane view of a stator yoke according to another embodiment of the invention.

FIG. 6 is a plane view of a stator yoke according to another embodiment of the invention.

The embodiment is formed with a slit 36 by cutting an inner peripheral side of each teeth press fit hole 37 formed at a stator yoke 23. Even when the inner peripheral side of each teeth press fit hole 37 is cut in this way, similar to the example of FIG. 5, the induced current can be blocked.

Figure 7:
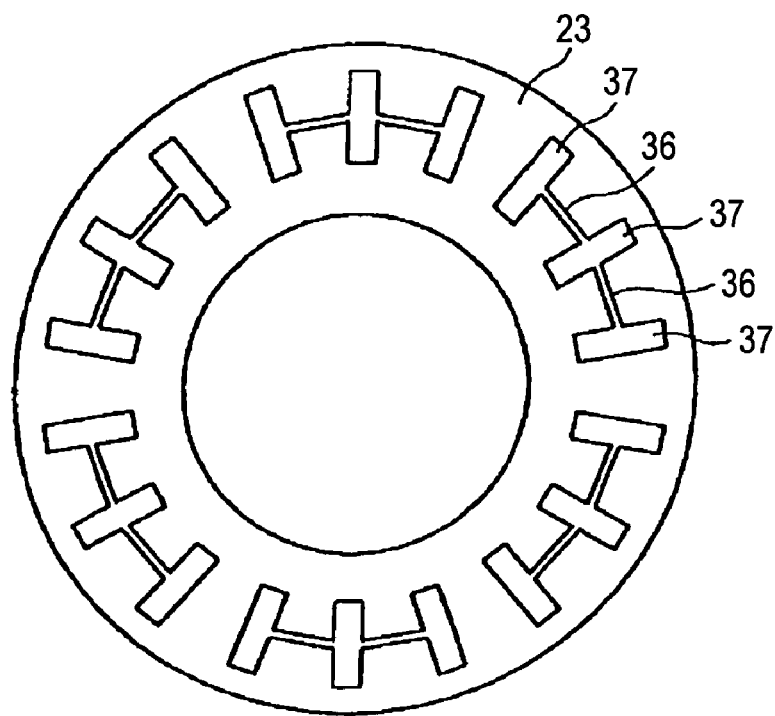
FIG. 7 is a plane view of a stator yoke according to still another embodiment of the invention.

FIG. 7 is a plane view of a stator yoke according to still another embodiment of the invention.

The embodiment is formed with a slit 36 in a circular arc shape or a linear shape by communicating central portions in a radial direction of teeth press fit holes 37 contiguous to each other. In this way, the slit 36 is formed along a circumferential direction (a direction orthogonal to the radial direction) of a stator yoke 23. By the slit 36, an induced current formed at a surrounding of the press fit hole fixed with the tooth can be blocked or reduced.

In this case, the induced current can effectively be restrained from being generated by forming the slit 36 by connecting a set of the teeth 24 constituting 360° in an electrical angle. The example of FIG. 7 is an example of forming an electrical angle of 360° by three pieces of contiguous teeth 24 (U phase, V phase, W phase) in a motor having 18 slots and 12 poles and the slit 36 is formed by connecting the central portions in the radial direction of the respective teeth press fit holes 37 at every three pieces of the teeth press fit holes 37 contiguous to each other. Further, a position of the slit 36 may also be other than the central portion.

Figure 8:
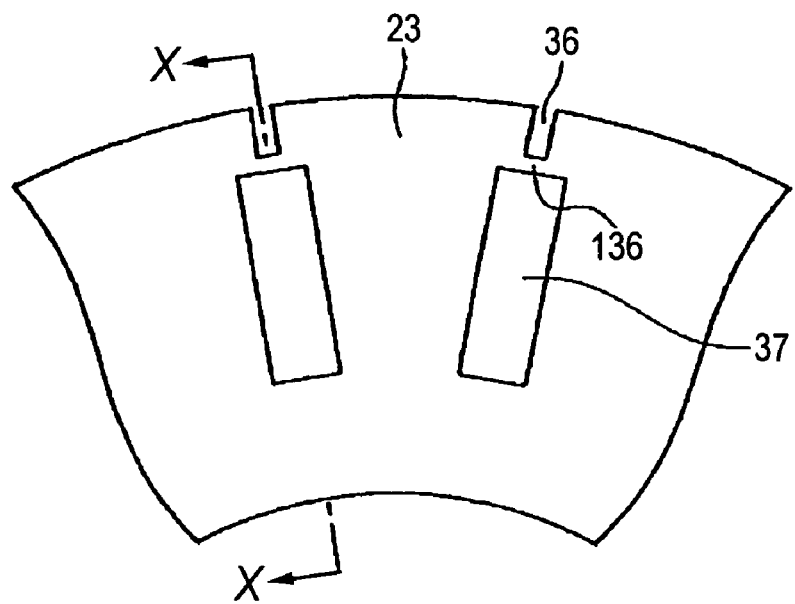
FIG. 8 is a shape explanatory view of still another embodiment of the invention.

FIG. 8 is an explanatory view of a shape of still another embodiment of the invention.

The embodiment is formed with a connecting portion 136 at an end portion of a slit such that a peripheral edge of teeth press fit hole 37 is brought into a continuous state without opening the slit 36 to the teeth press fit hole 37 but cutting the slit 36 before the teeth press fit hole. Thereby, not only the induced current is reduced but also deformation of the stator yoke and reduction in a force to hold the press-fitting teeth by forming the slit 36 can be prevented. Further, although the example of drawing shows an example of applying to the embodiment of FIG. 5 formed with the slit 36 on an outer peripheral side of the tooth, also with regard to the examples of FIG. 6 and FIG. 7, similarly, the slit 36 may be formed without opening the slit 36 to the teeth press fit hole 37 but in a state of making the peripheral edge of the teeth press fit hole 37 continuous.

Figure 9:
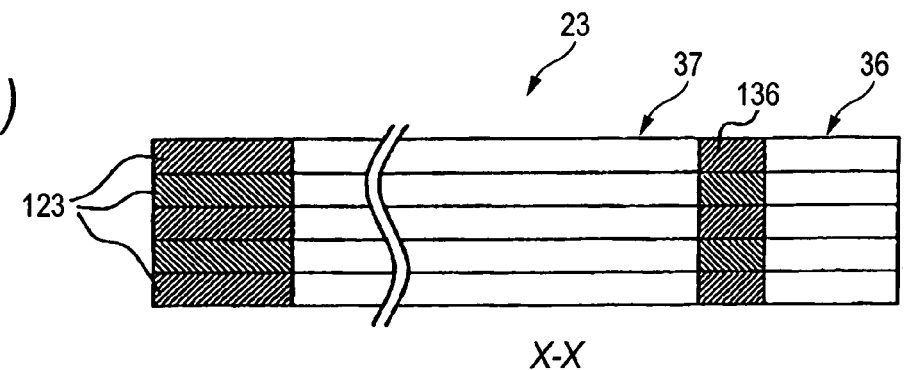
FIG. 9 illustrates sectional views of a stator yoke.
Figure 9:
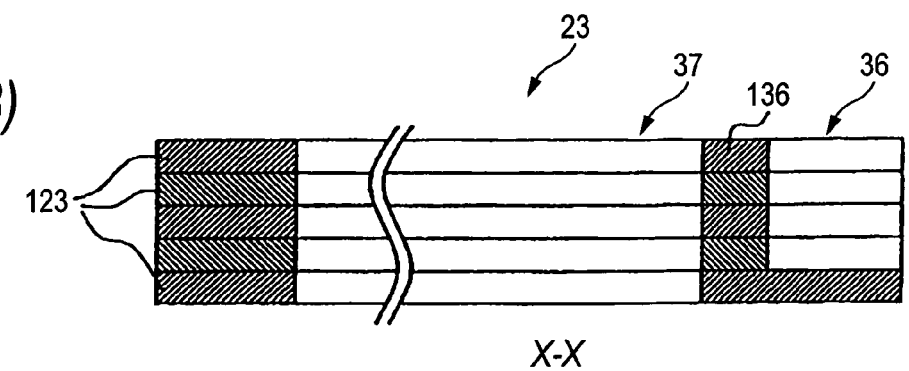
Figure 9:
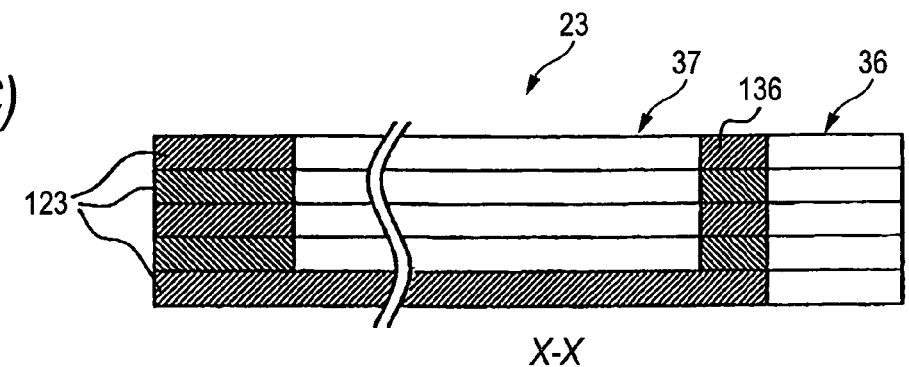

FIG. 9 illustrates sectional views of a portion of the yoke 23 taken along a line X—X of FIG. 8.

As shown in FIG. 9(A), the stator yoke 23 is the laminated member of the plate members 123 for the yoke and the connecting portion 136 is formed between the press fit hole 37 and the slit 36.

FIG. 9(B) is a modified example of FIG. 9(A) and is an example in which the slit 36 is not penetrated in the plate thickness direction of the yoke 23 but is formed to a middle thereof. According to the example, the lowermost plate member 123 of the yoke is not formed with an opening for the slit. In this way, by providing a portion in which the slit is not formed also in the plate thickness direction of the yoke along with the connecting portion 136, an effect of preventing deformation of the yoke is increased.

FIG. 9(C) shows the press fit hole 37 in a shape of a recess in which the press fit hole 37 is not penetrated in the plate thickness direction of the yoke 23 but is formed to a middle thereof. According to the example, the lowermost plate member 113 of the yoke is not formed with the press fit hole 37.

FIG. 10(A) through 10(G) are views showing still another examples of shapes of resistance portions against the induced current according to the invention.

Figure 10:
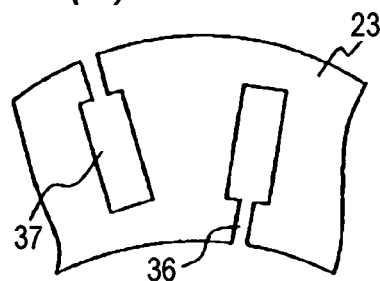
FIG. 10 illustrates explanatory views of examples of shapes of slits.
Figure 10:
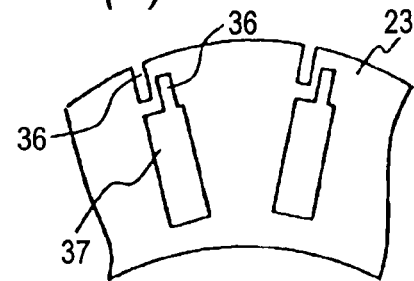
Figure 10:
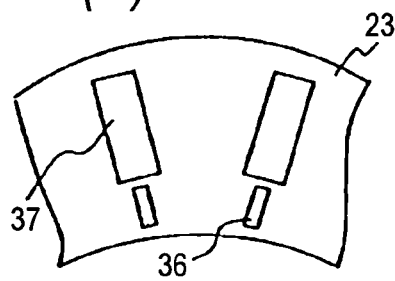
Figure 10:
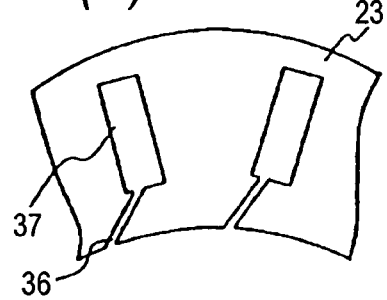
Figure 10:
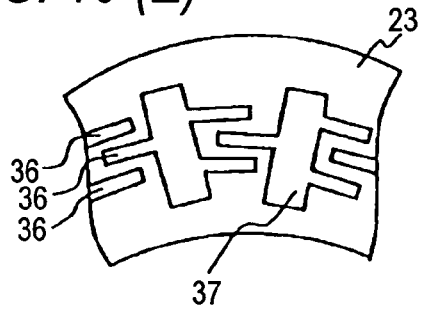
Figure 10:
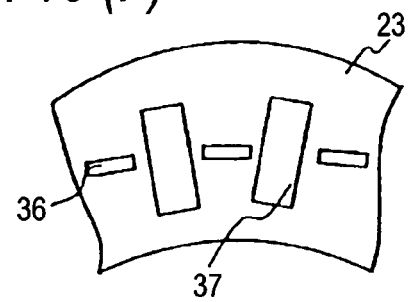
Figure 10:
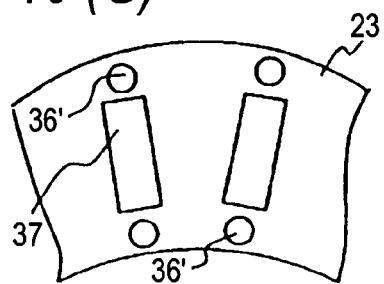

FIG. 10(A) is formed with the slits 36 alternately on the inner peripheral side and the outer peripheral side of the press fit holes 37. The slits 36 may not alternately be provided at every inner peripheral side and outer peripheral side of the press fit holes 37 but at every plural pieces thereof.

FIG. 10(B) is formed with two of the slits 36 from a reverse direction on the outer peripheral side (or inner peripheral side). By aligning two (or more) of the slits in a labyrinth shape in a state in which end portions of the slits on one side are not opened but closed to be continuous in this way, similar to the example of FIG. 8, not only the strength of the yoke is maintained but also the resistance against the induced current is increased and the effect of reducing the induced current is increased.

In FIG. 10(C), both end portions of the slits 36 in the radial direction are not opened but closed to connect. That is, in the example of FIG. 8, also with regard to the outer peripheral edge side of the yoke 23, the end portions of the slits 36 are made to be continuous similar to those on the inner peripheral side.

In FIG. 10(D), the slit 36 in the radial direction is inclined in a skewed direction. The slit 36 may be bent.

In FIG. 10(E), between the press fit holes 37 contiguous to each other, the plurality (three in this example) of the slits 36 are provided in the circumferential direction in a labyrinth shape similar to FIG. 10(B).

In FIG. 10(F), between the press fit holes 37 contiguous to each other, the slit 36 which is made to be continuous by closing both ends thereof similar to FIG. 10(C) are provided in the circumferential direction.

In FIG. 10(G), a resistance portion against the induced current is constituted by forming holes 36', in a circular shape in place of the slits 36 on the inner peripheral side and the outer peripheral side of the press fit hole 37. The shape, a position and a number of the resistance portions (holes 36') are not limited to those of the example of the drawing.

FIG. 11 is an exploded view of the stator according to the invention.

According to the example, the stator according to the embodiment of FIG. 5 is shown. The stator yoke 23 formed with the slit 36 on the outer peripheral side of the teeth press fit hole 37 is the laminated member of the plate members 123 for the yoke formed of steel plates. The tooth 24 which is the laminated member of the plate members 124 for the teeth formed of steel plates is inserted into the stator yoke 23 by passing a bobbin (insulator) 38 made of an insulating member and a bobbin flange 39 which are mounted at a position of each teeth press fit hole 37 of the stator yoke 23. The tooth 24 is fixedly held by press-fitting the press fit portion 24a at a lower end thereof into the teeth press fit hole 37. The coil 25 is wound around the tooth 24 via the bobbin 38.

Figure 12:
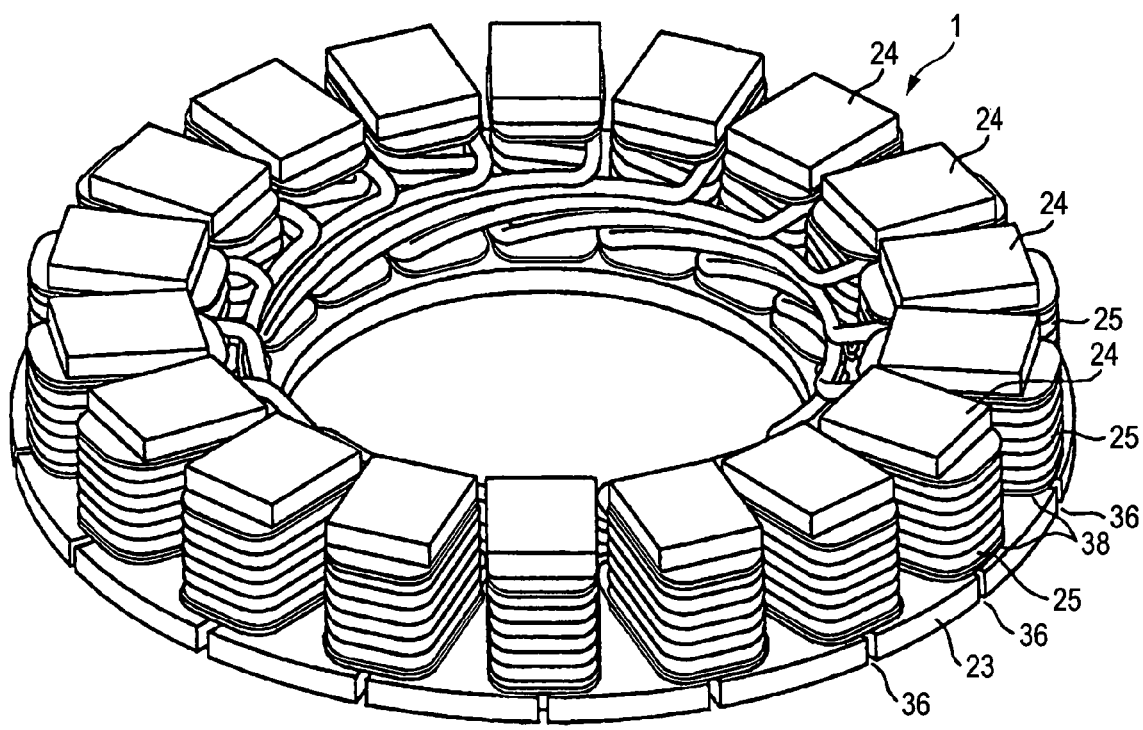
FIG. 12 is a whole perspective view of the stator of FIG. 11.

FIG. 12 is a whole perspective view of the stator according to the invention.

As shown in FIG. 11, mentioned above, the teeth 24 wound with the coils 25 via the bobbins 38 are aligned radially above the ring-like stator yoke 23 and press-fitted to be fixedly held. Thereby, the stator is formed. According to the example, the slit 36 is formed at the stator yoke 23 on the outer peripheral side of each tooth 24.

Figure 13:
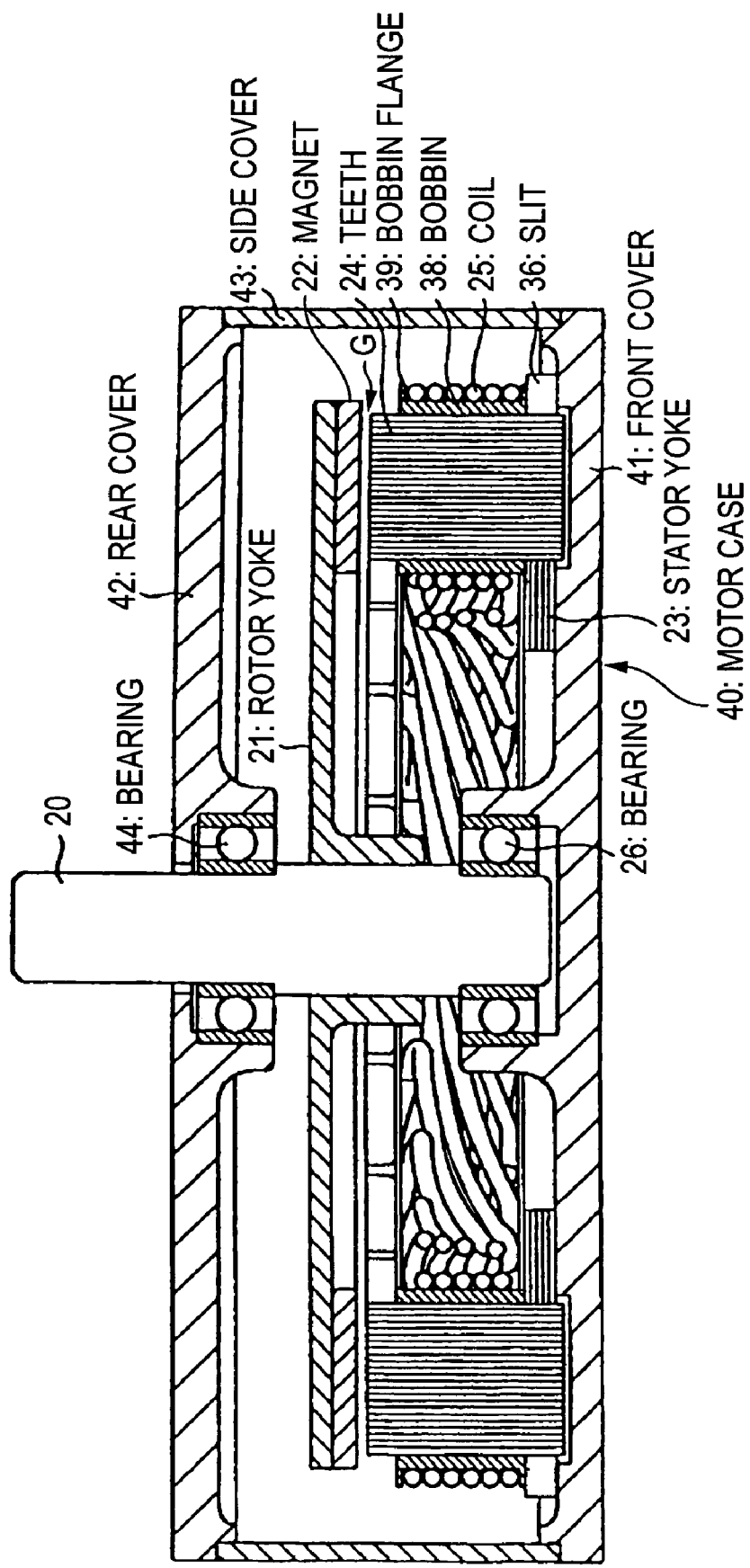
FIG. 13 is a whole sectional view of an electric motor integrated with the stator of FIG. 12.

FIG. 13 is a whole sectional view of an electric motor integrated with the stator of FIG. 12.

A motor case 40 surrounding the entire motor is constituted by a front cover 41 and a rear cover 42 in a circular plate shape and a side cover 43 in a cylindrical shape. The front cover 41 is fixed with the stator yoke 23 formed with the above-described slit 36 of the invention. An end portion of the rotor shaft 20 is rotatably mounted to the front cover 41 via the bearing 26. The vicinity of the outer end portion of the rotor shaft 20 is rotatably supported by the rear cover 42 via a bearing 44. The rotor yoke 21 is fixed to the rotor shaft 20. The rotor yoke 21 is fixed with the magnet 22. The teeth 24 press-fit to the stator yoke 23 is arranged to be opposed to the magnet 22 via a predetermined gap G therebetween.

Figure 14:
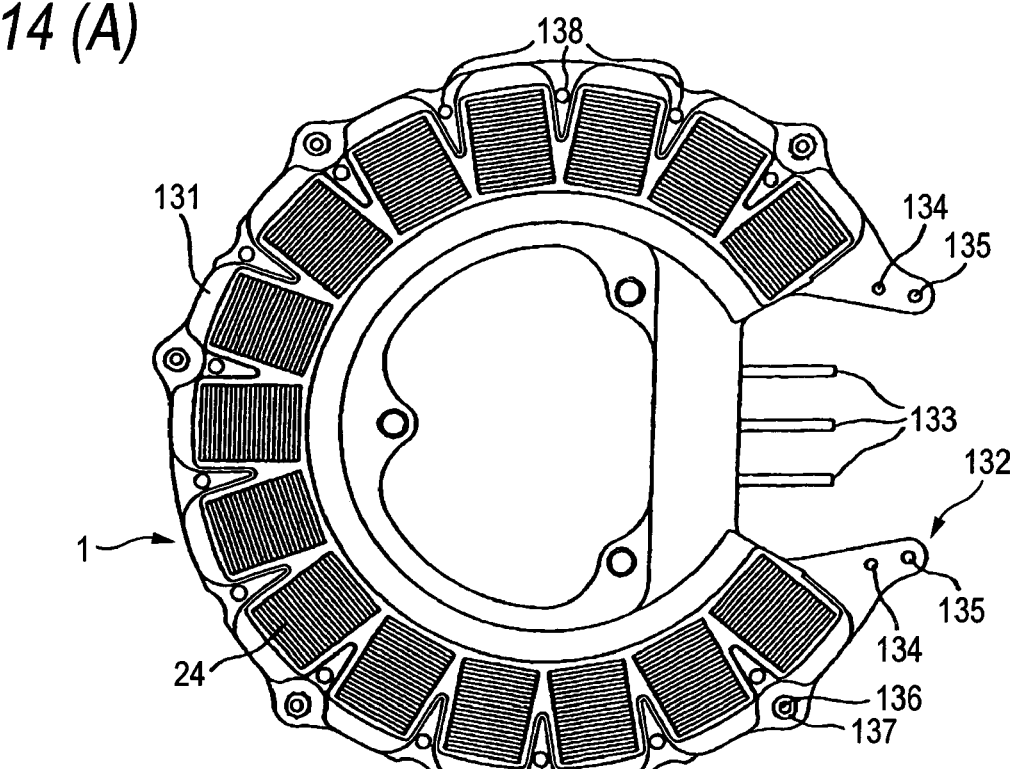
FIG. 14 illustrates explanatory views of an embodiment of the invention sealed by a resin mold.
Figure 14:
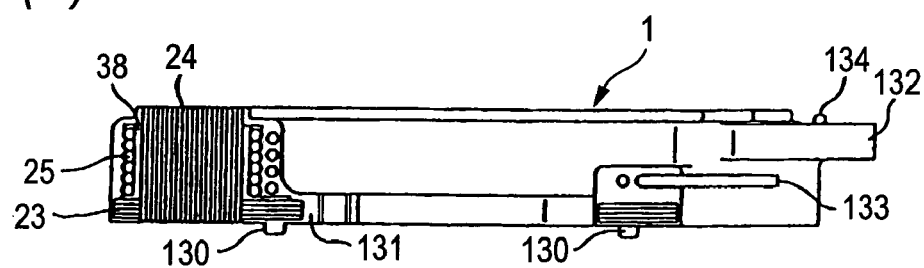

FIG. 14 shows the stator sealed by a resin mold. FIG. 14(A) is a plane view and FIG. 14(B) is a sectional view.

The yoke 23 is mounted with the plurality of teeth 24 in a ring-like shape and each tooth 24 is wound with the coil 25 via the bobbin 38. Substantially the whole stator 1 having the yoke 23 and the teeth 24 in this way is molded and sealed by a resin member 131. A lower face side and a base plate attaching portion 132 of the resin mold member are formed with positioning bosses 130, 134. Numeral 135 designates a screw hole for attaching the base plate. A peripheral edge portion of the resin mold member is formed with an attaching hole 136 and mounted with a collar 137.

By sealing the stator 1 by the resin mold in this way, the teeth 24 mounted with the coil or the like is firmly held fixedly by the yoke 23. Further, when the above-described various slits 36 or the like are formed in order to reduce the induced current, the yoke is liable to be deformed in press-fitting the teeth, however, even when the yoke is deformed, when the yoke is subjected to molding, the yoke can be set in a state of being corrected by a die and the stator can be molded in an undeformed shape having high dimensional accuracy.

When the deformation is corrected in this way, a mark 138 of a hold pin provided at the die for correcting the yoke is formed at the mold member of the resin mold 131. In this example, the mark 138 of the hold pin is formed on the yoke between the respective teeth 23, the portion is not provided with the resin and a surface of the yoke is exposed. The marks 138 of the hold pins are also formed on a rear face side of the stator 1.

Figure 15:
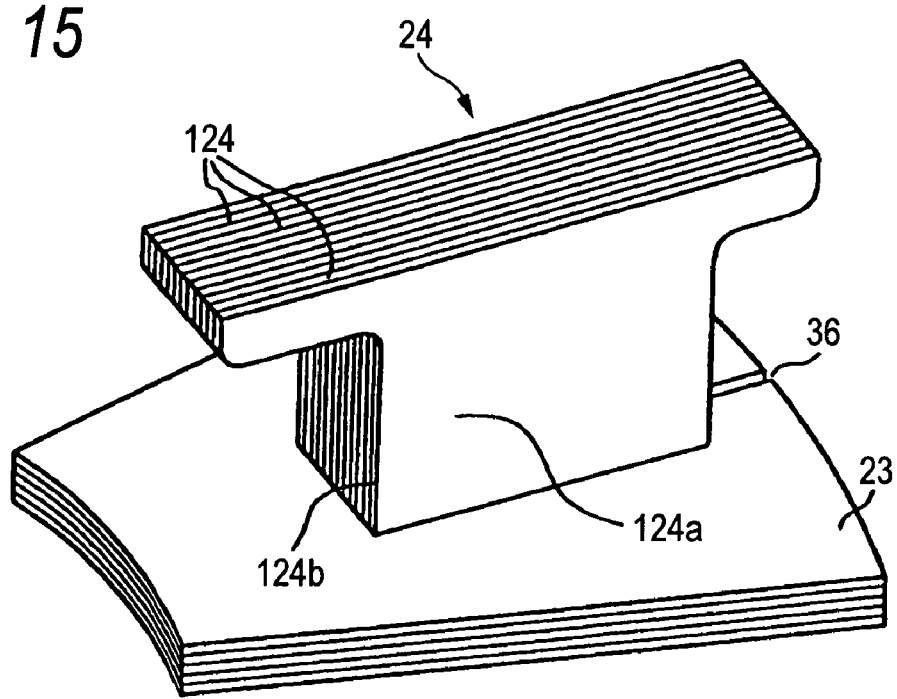
FIG. 15 is a perspective view of another embodiment of the invention.

FIG. 15 is a perspective view of teeth according to another embodiment of the invention.

According to the embodiment, a laminating direction of the tooth 24 is changed. That is, according to the example of FIG. 15, the plate face 124a (refer to both front and rear faces with respect to each sheet of the plate member 124) constituting the face to be superposed of the respective plate members 124 for the teeth constituting the teeth 24 of the laminated member is directed in the radial direction of the stator yoke 23. The side face 124b (the face showing the plate thickness of the steel plate) of the plate member 124 for the teeth is arranged in the circumferential direction of the stator yoke 23.

Even when the plate face 124a constituting the face to be superposed of the respective plate members 124 for the teeth is directed in the radial direction in this way, similar to the above-described example (FIG. 11) directing the plate face 124a in the circumferential direction, the effect of reducing the induced current by the slit 36 is sufficiently achieved.

Figure 16:
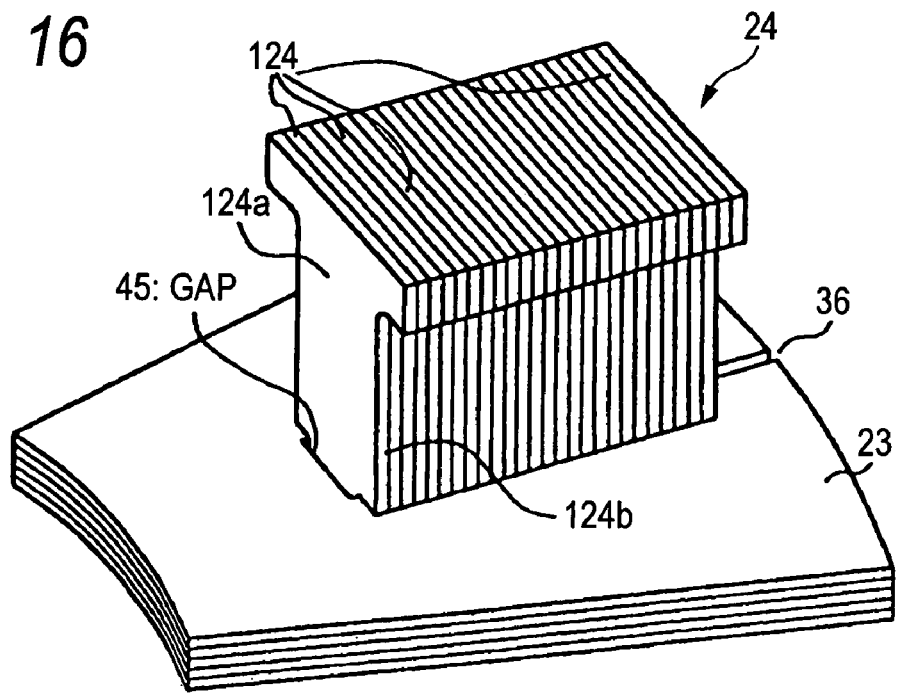
FIG. 16 is a perspective view of still another embodiment of the invention.

FIG. 16 is a perspective view of still another embodiment of the invention.

According to the embodiment, gaps 45 are provided at press fit portions on an inner peripheral side and an outer peripheral side (only the inner peripheral side is illustrated) of the tooth 24 press-fitted to the stator yoke 23. Further, according to the example, with regard to a section in a rectangular shape of the press fit portion of the tooth 24, a long side thereof is directed in the radial direction and a short side thereof is directed in the circumferential direction. In this case, the plate face 124a constituting the face to be superposed of the plate member 124 for the teeth is arranged on the side of the short side and the side face 124b (face showing the plate thickness) of the plate member 124 for the teeth is arranged on the side of the long side. Therefore, the gap 45 is formed on the side of the plate face 124a constituting the face to be superposed of the teeth 24 and on the side of the short side of the rectangular shape. The gap 45 is formed by notching the teeth press fit hole 37 provided at the yoke 23.

By the gap 45, the magnetic flux passing the plate face 124a on the side of the short side arranged in the circumferential direction is reduced, the induced current based on the magnetic flux is reduced and the energy loss is further alleviated. Further, by arranging the side face 124b of each plate members 124 on the side of the long side, the large induced current generated on the side of the long side can effectively be reduced by a resistance of the boundary faces of the laminated layers.

Figure 17:
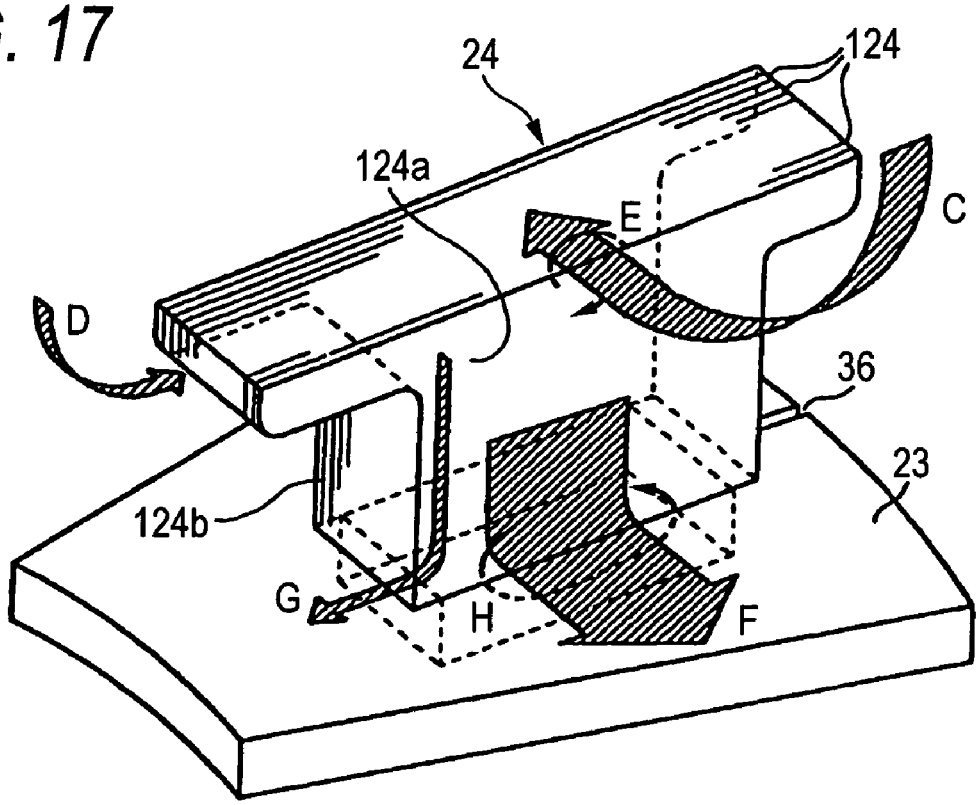
FIG. 17 is an explanatory view of a magnetic flux of the embodiment of FIG. 15.

FIG. 17 is an explanatory view of a flow of the magnetic flux when the plate face 124a of each plate member 124 for the teeth of the tooth 24 shown in FIG. 15, mentioned above, is directed in the radial direction, the plate members are laminated in the circumferential direction and the side of the long side of the press fit portion is made to constitute the plate face 124a.

The magnet, not illustrated, is arranged oppositely to the upper face side of the tooth 24. The magnetic flux (not illustrated) is made to flow from the magnet to the upper face of the tooth, and a magnetic flux C and the magnetic flux D are made to flow from side faces of an upper portion of the tooth other than the magnetic flux flowing from the upper face. At this occasion, the magnetic flux C flowing from the side of the plate face 124a constituting the face to be superposed of the tooth 24 is larger than the magnetic flux D flowing from the side of the side face 124b of the plate member 124 for the teeth constituting the face showing the plate thickness. An eddy current is made to flow at in-face at the plate face 124a and therefore, a comparatively large induced current E is generated based on the magnetic flux C at in-face of each plate member 124.

Further, with regard to a magnetic flux coming out from the tooth 24 to the side of the stator yoke 23, a large magnetic flux F is made to flow from the side of the long side of the press fit portion having a section in the rectangular shape and a small magnetic flux G is made to flow from the side of the short side. Also in the magnetic flux on the outlet side, a comparatively large induced current H is generated at in-face of each steel plate based on the large magnetic flux on the side of the long side.

Figure 22:
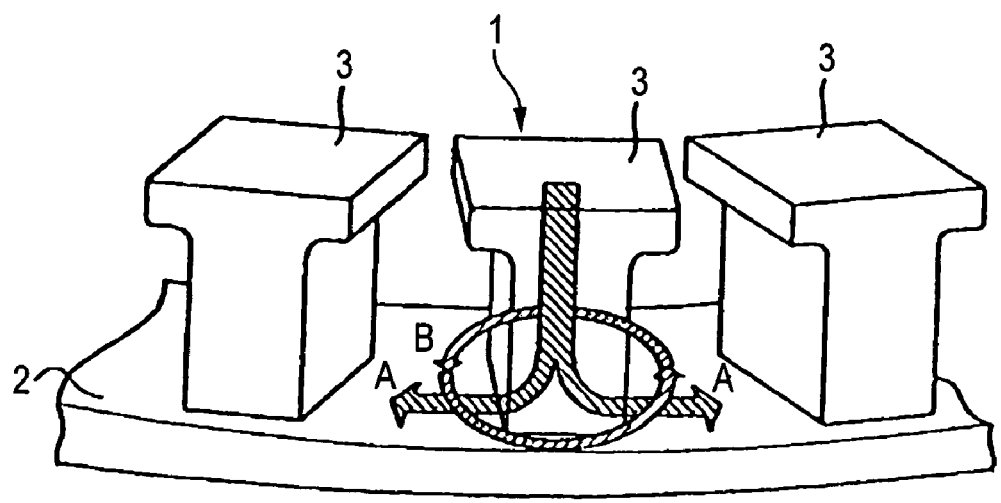
FIG. 22 is an explanatory view of an induced current in a stator of a background art.

Therefore, according to the constitution in which the side of the long side of the press fit portion having the section in the rectangular shape is made to constitute the plate face 124a by directing the plate face 124a constituting the face to be superposed of the teeth 24 in the radial direction, although the induced current B flowing to a total of the surrounding of the tooth 24 shown in FIG. 22, mentioned above, is effectively blocked by the slit 36, the induced currents E, H by the magnetic fluxes in the direction orthogonal to the lateral face of the tooth 24 are made to flow at in-face of each plate member 124 for the teeth and energy loss thereby is generated.

Figure 18:
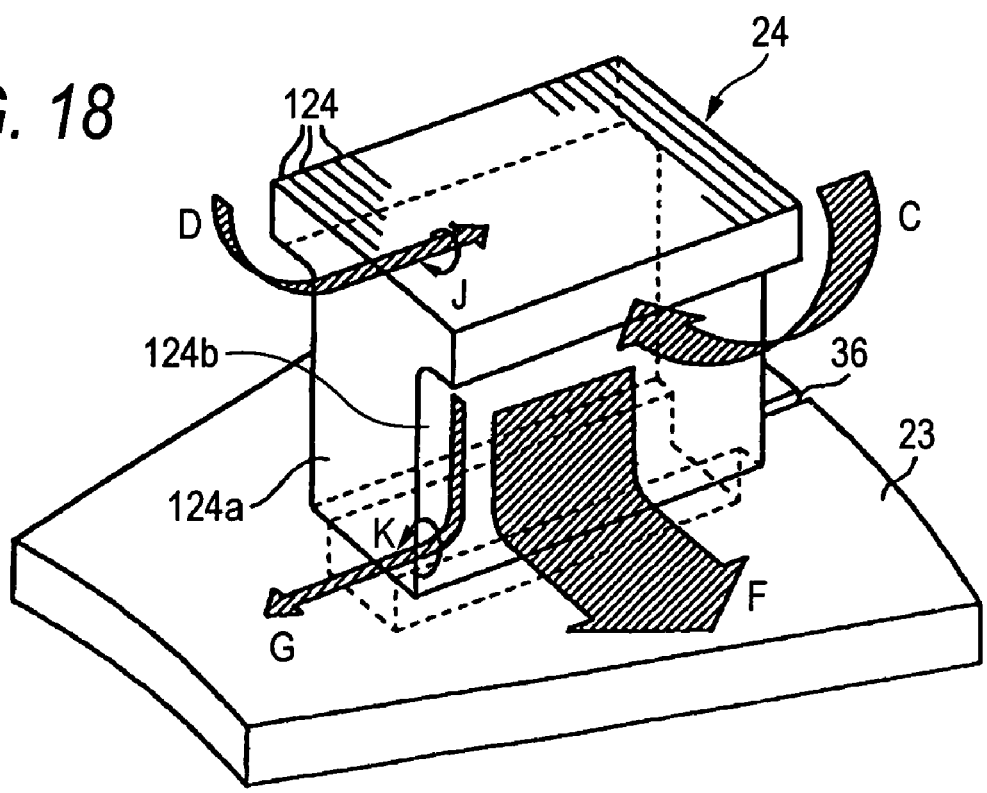
FIG. 18 is an explanatory view of a magnetic flux of the embodiment of FIG. 11.

FIG. 18 is an explanatory view of a flow of a magnetic flux when the plate face 124a constituting the face to be superposed of the plate member 124 for the teeth of the tooth 24 shown in FIG. 11 and FIG. 16, mentioned above, is directed in the circumferential direction and the side of the long side of the press fit portion orthogonal thereto is made to constitute the side face 124b showing the plate thickness of each plate member 124.

Similar to the above-described example of FIG. 17, the magnet, not illustrated, is arranged oppositely to the side of the upper face of the tooth 24. The magnetic flux (not illustrated) is made to flow from the magnet to the upper face of the tooth and the magnetic flux C and the magnetic flux D are made to flow from the lateral faces of the upper portion of the tooth other than the magnetic flux flowing from the upper face. At this occasion, the magnetic flux C flowing from the lateral face on the side of the side face 124b of the plate member 124 of the tooth 24 is larger than the magnetic flux D flowing from the lateral face on the side of the plate face 124a constituting the face to be superposed.

In the case of the tooth 24 of FIG. 18, since the plate face 124a is directed in the circumferential direction, an induced current J is generated based on the magnetic flux D at in-face of each plate member 124, however, the induced current J is small since the magnetic flux D is small.

Further, also with regard to the magnetic flux coming out from the tooth 24 to the side of the stator yoke 23, similar to the above-described example of FIG. 17, the large magnetic flux F is made to flow from the side of the long side of the press fit portion having the section in the rectangular shape and the small magnetic flux G is made to flow from the side of the short side. Also with regard to the magnetic flux on the outlet side, according to the example of FIG. 18, the plate face 124a of the tooth 24 is disposed on the side of the short side and therefore, an induced current K is generated at in-face of the steel plate based on the magnetic flux G on the side of the short side, however, the induced current K is small since the magnetic flux G is small.

Therefore, as shown in FIG. 18, by directing the face on the side of the side face 124b showing the plate thickness of each plate member 124 for the teeth of the tooth 24 in the radial direction and providing the face on the side of the long side of the press fit portion having the section in the rectangular shape, the energy loss can be alleviated by reducing the induced current by the magnetic flux brought into the tooth via the lateral face of the tooth.

FIGS. 19(A) through 19(E) are explanatory views of shapes of teeth press fit holes according to still other embodiments of the invention.

Figure 19:
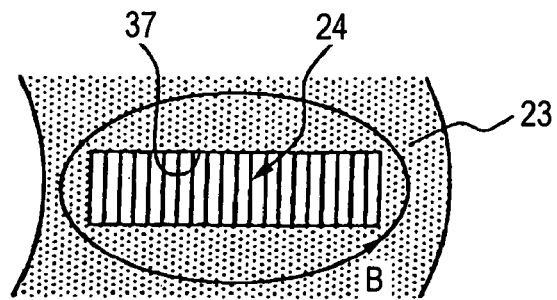
FIG. 19 illustrates explanatory views of other embodiments of the invention.
Figure 19:
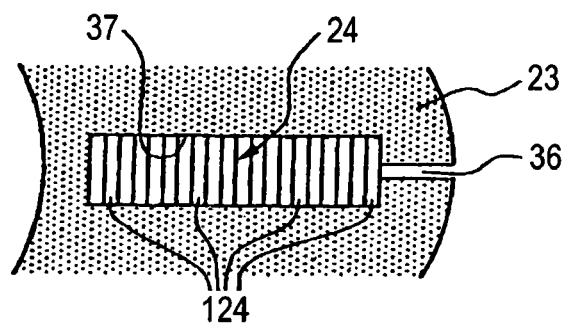
Figure 19:
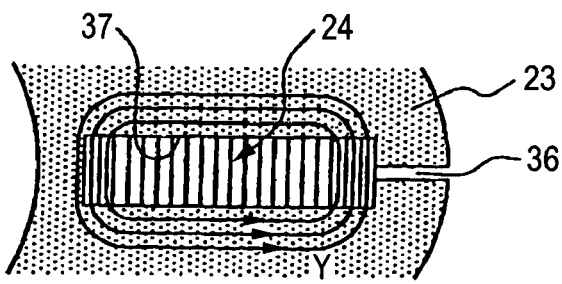
Figure 19:
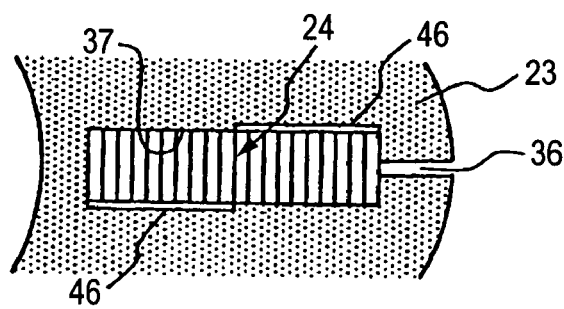
Figure 19:
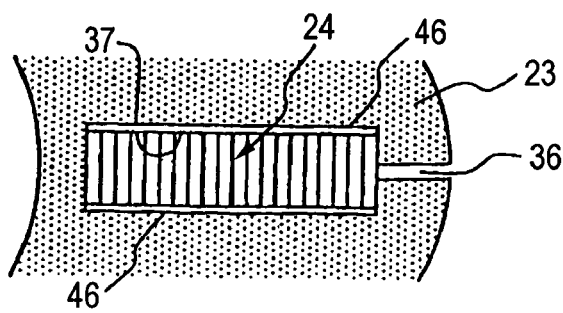

FIG. 19(A) shows the structure of the background art and the tooth 24 having the laminated member of the steel plates is press-fit to the press fit hole 37 of the stator yoke 23. According to the structure, the induced current B is generated as described above. The induced current B is blocked by forming the slit 36 as shown in FIG. 19(B). However, when the face (refer to FIG. 11, FIG. 16) on the side of the side face 124a of the plate member 124 for the teeth of the tooth 24 is brought into press contact (contact with low resistance) with the inner face of the press fit hole 137 of the yoke 23, as shown in FIG. 19(C), an induced current Y detouring the slit 36 via the press contact face is made to flow. According to the embodiment, as shown in FIG. 19(D), respective side faces of the tooth 24 are provided with insulating layers by gaps 46 (or insulating films) having a length of, for example, a half of the length of the long side by shifting positions thereof from each other. Thereby, the induced current Y via the respective plate members 124 is blocked over a total length of the long side. The gaps 46 may be formed along the total length of the long sides on the both sides of the press fit hole 37 (or the total length of the long side only on one side) as shown in FIG. 19(E).

Figure 20:
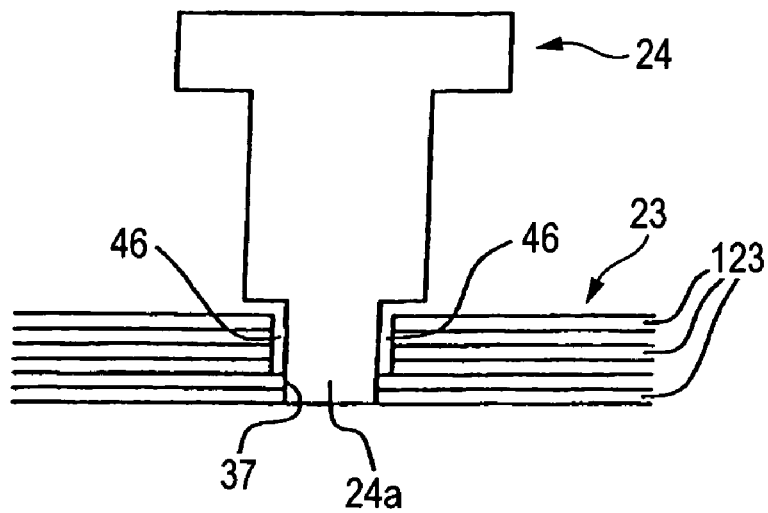
FIG. 20 illustrates explanatory views of other embodiments of the invention.
Figure 20:
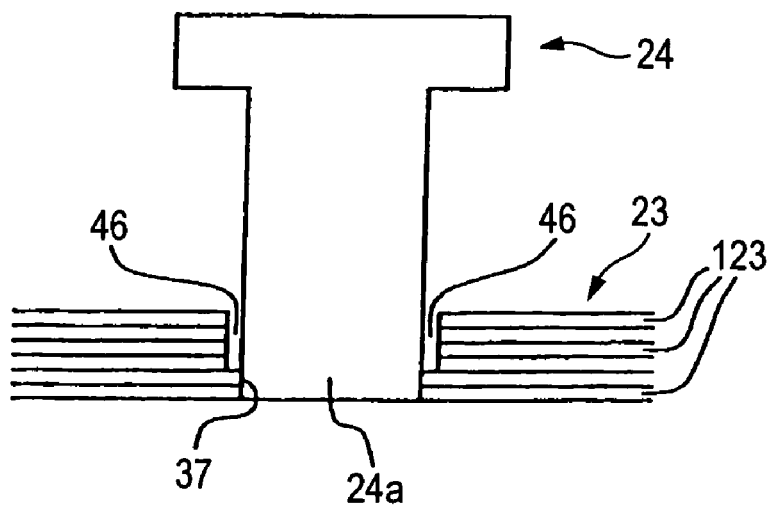
Figure 20:
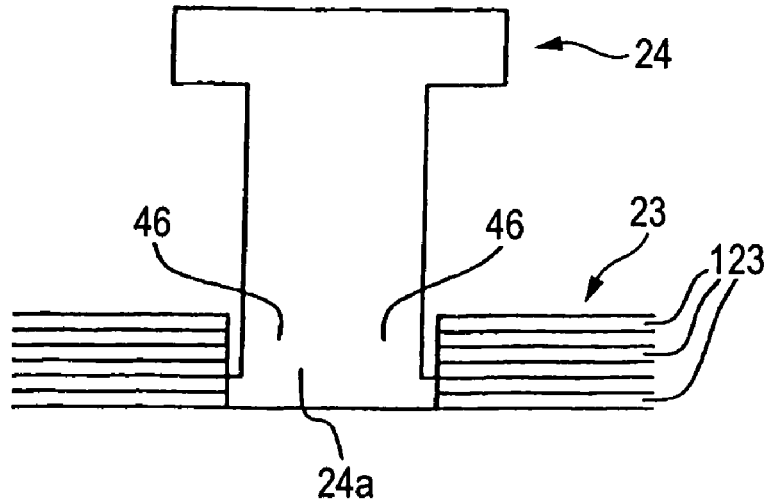

In the case of FIG. 19(E), as shown in FIG. 20, the press fit portion 24a of the tooth 24 can firmly be held fixedly at inside of the press fit hole 37 by several sheets of the plate members 123 by not forming the gap 46 over the total of the yoke 23 in the thickness direction and by not forming the gap 46 at the several lower sheets of the plate members 123 for the yoke. Also in the case of FIG. 19(D), a force of fixedly holding the tooth 24 may be increased by not forming the gap 46 at the several lower sheets of the plate members 123 of the yoke in this way.

The gap 46 is for blocking the induced current and therefore, the embodiment is not limited to the gap having the space but an electrically insulating member may be provided. That is, a resistance portion against the induced current may be constituted.

FIG. 20 shows examples of forming the resistance portion (gap 46) provided at the press fit portion. In FIG. 20(A), the gaps 46 are provided on both sides of the press fit portion 24a having a narrow width formed at the lower end portion of the tooth 24. In FIG. 20(B), a total of a lower portion of the tooth 24 is formed by a shape having the same width including the press fit portion 24a at the lower end and the gaps 46 are formed on the both sides of the press fit portion 24a on the side of the yoke 23. In FIG. 20 (C), the press fit portion 24a is formed by widening the width of the lower end portion of the tooth 24, the press fit portion 37 on the side of the yoke 23 stays to be the same through hole and the gaps 46 are formed on an upper side of the press fit portion 24a. Further, in any of the cases, the gap 46 may be formed only on one side of the tooth 24.

Figure 21:
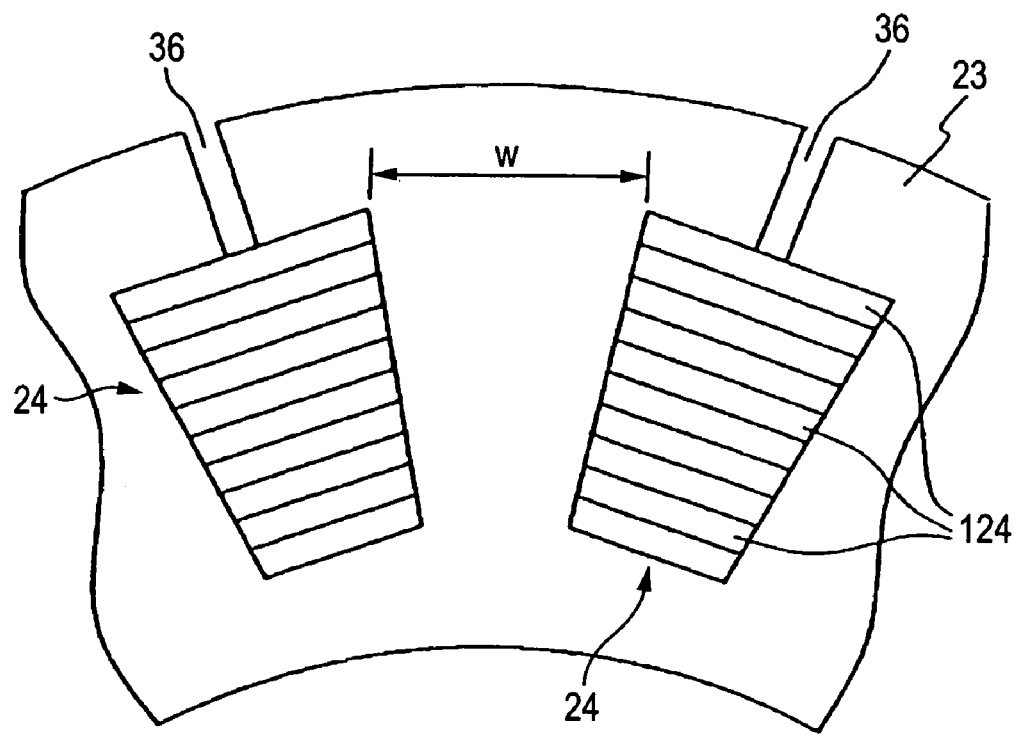
FIG. 21 is an explanatory view of another embodiment of the invention.

FIG. 21 shows another embodiment of the invention.

According to the embodiment, the shape of the teeth 24 is formed not by the rectangular shape but by a trapezoidal shape different from the above-described embodiment. The trapezoidal shape is a slender trapezoidal shape having a long side on an outer peripheral side and a short side on an inner peripheral side and constituting a longitudinal direction thereof by a radial direction. By constituting the teeth 24 by the trapezoidal shape in this way, in comparison with the case of the rectangular shape, an interval W on the outer peripheral side between the contiguous tees 24 can be reduced. Thereby, the induced current can be reduced by increasing the magnetic flux brought from the magnet (not illustrated) opposed to the upper face of the teeth to inside thereof via the upper face of the teeth and reducing the magnetic flux of an extruded portion brought from a lateral face thereof.

The teeth 24 having such a trapezoidal shape is formed by changing a shape of the laminated plate member 124 for the teeth such that a width thereof is gradually reduced.

INDUSTRIAL APPLICABILITY

As has been described above, according to the invention, by arranging the face of the teeth formed of the laminated member of the plate members for the teeth for superposing the respective plate members for the teeth in the circumferential direction, the induced current by the magnetic flux flowing from the magnet to the teeth can effectively be reduced.

In this case, the fixing hole for fixing the teeth provided at the yoke is formed by the shape having the longitudinal direction, and according to the constitution in which the longitudinal direction is directed in the radial direction, the face (face in which eddy current is difficult to flow) from which the side faces of the respective plate members for the teeth are seen is arranged in the longitudinal direction, the face is arranged on the side having the large magnetic flux and therefore, the induced current can efficiently be reduced.

Further, according to the constitution of forming the fixing hole into the rectangular shape, the teeth can be formed by laminating the plate members for the teeth having the constant shape.

Further, according to the constitution provided with the magnetic resistance portion between the side of the face to be superposed of the tooth and the fixing hole of the stator yoke, by increasing the magnetic resistance by forming, for example, a space between the side of the face to be superposed of the plate member for the teeth at which the eddy current is liable to be formed and the fixing hole, the magnetic flux passing the face is reduced and the induced current is reduced.

Further, according to the constitution provided with the resistance portion against the induced current between the side face showing the plate thickness of each plate member for the teeth and the fixing hole of the stator yoke, the induced current can effectively be reduced. That is, although normally, the press fit face of the laminated layers of the teeth press-fit to the fixing hole is brought into close contact therewith and the current is liable to flow and therefore, the eddy current flows between the laminated plate members for the teeth, the induced current can be reduced by increasing the electric resistance by providing the space or the insulating member or the like at the press fit close contact face.

The invention claimed is:

1. An axial gap type rotating electric machine comprising:
a yoke on a side of a rotor in a circular plate shape fixed to a rotating shaft;
a yoke on a side of a stator in a circular plate shape opposed to the yoke on the side of the rotor;
a magnet fixed to a side of an opposed face of either one of the yokes on the side of the rotor or the side of the stator;
a plurality of teeth arranged on a side of an opposed face of other yoke on the side of the rotor or the side of the stator radially and opposedly to the magnet and fixed to the yoke; and
a coil wound around each of the plurality of teeth;
wherein the teeth comprises a laminated member of plate members for the teeth and faces to be superposed of the plate members for the teeth are arranged in a circumferential direction, and
a magnetic resistance portion is provided between a side of the face to be superposed of the tooth and the fixing hole of the stator yoke.

2. An axial gap type rotating electric machine comprising:
a yoke on a side of a rotor in a circular plate shape fixed to a rotating shaft;
a yoke on a side of a stator in a circular plate shape opposed to the yoke on the side of the rotor;
a magnet fixed to a side of an opposed face of either one of the yokes on the side of the rotor or the side of the stator;
a plurality of teeth arranged on a side of an opposed face of other yoke on the side of the rotor or the side of the stator radially and opposedly to the magnet and fixed to the yoke; and
a coil wound around each of the plurality of teeth;
wherein the teeth comprises a laminated member of plate members for the teeth and faces to be superposed of the plate members for the teeth are arranged in a circumferential direction, and
a resistance portion against an induced current is provided between a side face showing a plate thickness of each plate member for the teeth and the fixing hole of the stator yoke.

* * * * *